United States Patent
Heinsohn et al.

(10) Patent No.: US 11,825,834 B2
(45) Date of Patent: Nov. 28, 2023

(54) AGRICULTURAL APPLICATOR AND SYSTEM

(71) Applicants: Jeffery W. Heinsohn, Harvard, IL (US); Andrew James Blackmer, Cherry Valley, IL (US)

(72) Inventors: Jeffery W. Heinsohn, Harvard, IL (US); Andrew James Blackmer, Cherry Valley, IL (US)

(73) Assignee: WGF LLC, Kirkland, IL (US)

( * ) Notice: Subject to any disclaimer, the term of this patent is extended or adjusted under 35 U.S.C. 154(b) by 180 days.

(21) Appl. No.: 17/338,310

(22) Filed: Jun. 3, 2021

(65) Prior Publication Data
US 2021/0289767 A1    Sep. 23, 2021

Related U.S. Application Data

(63) Continuation of application No. 16/019,326, filed on Jun. 26, 2018, now Pat. No. 11,026,414.
(Continued)

(51) Int. Cl.
*A01M 7/00* (2006.01)
*A01C 23/02* (2006.01)
(Continued)

(52) U.S. Cl.
CPC .......... *A01M 7/0078* (2013.01); *A01C 23/02* (2013.01); *A01M 7/005* (2013.01); *A01M 7/006* (2013.01);
(Continued)

(58) Field of Classification Search
CPC .... A01M 7/0042; B05B 13/005; B05B 15/62; B05B 15/628; B05B 15/652; B05B 15/654; B05B 15/656; B05B 15/68; B05B 1/20
(Continued)

(56) References Cited

U.S. PATENT DOCUMENTS

| | | | | |
|---|---|---|---|---|
| 840,287 A | * | 1/1907 | Bardsley | A62C 31/24 239/587.2 |
| 2,874,677 A | * | 2/1959 | Braun | B05B 12/1418 118/305 |

(Continued)

FOREIGN PATENT DOCUMENTS

| | | | | |
|---|---|---|---|---|
| CN | 113714014 A | * | 11/2021 | |
| GB | 628730 A | * | 9/1949 | B05B 15/62 |

OTHER PUBLICATIONS

Utah Pneumatic, "Utah Pneumatic 6mm od to 6mm Push to Connect Fittings Pneumatic Fittings kit 2 Spliters+2 Elbows+2 tee+2 Straight+1 Manifold+ Hand Valves Ultimate Professional set10 Pack Plastic (6mm Combo)", Dec. 23, 2016 (Year: 2016).
(Continued)

*Primary Examiner* — Cody J Lieuwen
(74) *Attorney, Agent, or Firm* — Reinhart Boerner Van Deuren P.C.

(57) ABSTRACT

A variable width agricultural applicator is provided. The variable width agricultural applicator is attachable to a boom to apply a liquid to a crop in rows. The variable width agricultural sprayer includes a drop tube and a splitter downstream of the drop tube. The splitter is fluidly connected to the drop tube. A pair of flexible delivery tubes is fluidly connected to the splitter. Each one of the pair of flexible delivery tubes has a predetermined bend.

19 Claims, 11 Drawing Sheets

Related U.S. Application Data

(60) Provisional application No. 62/526,588, filed on Jun. 29, 2017.

(51) Int. Cl.

| | | |
|---|---|---|
| *B05B 13/00* | (2006.01) | |
| *B05B 15/14* | (2018.01) | |
| *B05B 15/62* | (2018.01) | |
| *B05B 15/652* | (2018.01) | |
| *B05B 15/656* | (2018.01) | |

(52) U.S. Cl.
CPC ........ *A01M 7/0057* (2013.01); *A01M 7/0085* (2013.01); *A01M 7/0089* (2013.01); *B05B 13/005* (2013.01); *B05B 15/14* (2018.02); *B05B 15/62* (2018.02); *B05B 15/652* (2018.02); *B05B 15/656* (2018.02); *A01M 7/0042* (2013.01)

(58) Field of Classification Search
USPC ...... 239/164–169, 280–281, 587.1–588, 600
See application file for complete search history.

(56) References Cited

U.S. PATENT DOCUMENTS

| | | |
|---|---|---|
| 3,478,967 A | 11/1969 | Horton et al. |
| 4,359,297 A | 11/1982 | Butler |
| 4,382,555 A | 5/1983 | Ucinhazska et al. |
| 4,479,610 A * | 10/1984 | Etheridge ............. B05B 15/652 239/587.6 |
| 4,842,195 A * | 6/1989 | Koll ...................... A01M 7/006 239/176 |
| 5,718,377 A | 2/1998 | Tedders et al. |
| 2011/0210186 A1* | 9/2011 | Kugler ................. A01M 7/006 239/11 |
| 2013/0043326 A1 | 2/2013 | Muff |
| 2015/0190663 A1* | 7/2015 | Garden ................... B05B 15/62 169/48 |
| 2016/0120117 A1 | 5/2016 | Lawrence et al. |
| 2017/0056908 A1* | 3/2017 | Logan .................. B05B 15/628 |
| 2018/0049381 A1 | 2/2018 | Parod et al. |
| 2018/0369851 A1 | 12/2018 | Engelbrecht et al. |
| 2019/0216009 A1 | 7/2019 | Stoller et al. |

OTHER PUBLICATIONS

Ducting.com, "Plastic Hose", Jan. 2017, <https://web.archive.org/web/20170126203556/https://www.ducting.com/hose-types/plastic-hose> (Year: 2017).

Nutraboss; Nutraboss website downloaded on Sep. 25, 2018 from https://www.nutra-boss.com/.; Applicants aware of a system by Nutraboss prior to Jun. 29, 2017.

\* cited by examiner

AGRICULTURAL APPLICATOR AND SYSTEM

CROSS-REFERENCE TO RELATED PATENT APPLICATION

This patent application is a continuation of co-pending U.S. patent application Ser. No. 16/019,326, filed Jun. 26, 2018, which claims benefit to U.S. Provisional Patent Application No. 62/526,588, filed Jun. 29, 2017, the entire teachings and disclosure of which are incorporated herein by reference thereto.

FIELD OF THE INVENTION

The present subject matter relates generally to an agricultural applicator and system for applying a liquid in a field of crops and more specifically to an agricultural applicator and system for applying liquid nitrogen, liquid herbicides, insecticides, and fertilizers to farm fields and crops growing in farm fields.

BACKGROUND OF THE INVENTION

Producers of the world's food supply continue to become more sophisticated in their efforts to modernize agricultural so as to make every operation involving crops more efficient while keeping production costs as low as possible. To that end, efforts continue to be devoted to ways to improve application of liquids, for example, nitrogen to herbicides, and fertilizers to crops in the field. Such efforts are intended to maximize yield while reducing labor costs, reducing production costs, reducing damage to crop and reducing time on task.

Application of liquid to a field of crops, and in particular to crops in parallel rows in a field is generally done utilizing booms on tractors or suitable delivery vehicles. Typically, the booms have nozzles that apply the liquid from the boom to the crop. The booms having "wing spans" projecting laterally from either side of a tractor. The booms can be pulled behind a tractor or can be configured such that they are in front of the tractor as it moves through a field of parallel rows of crops. Typically the booms can be raised or lowered to some degree to accommodate various crop heights. The booms can include a primary boom that is generally not foldable and extends laterally to a width generally only slightly greater than the width of the tractor. The primary boom is generally found just in front of just behind the tractor. Secondary booms can attach to lateral ends of the primary boom to extend the overall length of the primary boom to cover an even greater width of crops in a single pass through a field of crops.

A sub-boom can also be attached to the primary boom and/or secondary boom or both to provide further capability to the boom. In general, most conventional liquid application systems utilizing a boom have a pump and liquid metering valve connected to a supply tank of the liquid for porting the liquid via hose to supply nozzles on the boom to spray the crop. The pump is driven by the tractor through a power take off shaft or through a hydraulic motor.

The liquid is pumped from the tank to the nozzles on the boom through the hose under a pressure created by a pump. The liquid is sprayed on the crop via nozzles the nozzles on the boom. Application from sprayers on the boom may be advantageous in situations where application of the liquid onto foliage of the crop is desired. Further, the boom can used in some situations to bend, while not breaking a crop. That is, the boom leads or follows the tractor and bends the crop because its boom height is lower than the crop height. This bending permits greater penetration by the liquid exiting the nozzles of the boom to reach more foliage than would otherwise be the case where liquid is simply sprayed over the tops of the crop and cannot sufficiently penetrate a crop canopy.

Unfortunately, conventional booms and their nozzles may not be able apply a liquid at the correct height or angle to a crop as it is bent by the boom of even over the crop canopy if desired as the nozzles are limited to the height of the boom.

Also, at times, rather than spraying over a crop or bending the crop with the boom, it is desirous to apply liquid from directly to as near the roots or the base of the crop where the liquid can be most beneficial for the crop. Where application of the liquid to the roots, for example to roots where the crop is planted in rows, agricultural applicators with drop tubes are available to channel the applied liquid from the spray nozzles to drop tubes that extend from the boom to the ground. Where drop tubes are used, the applied liquid exits an opening of the drop tubes that are arranged to be driven between parallel rows of crops in the field. The liquid exiting a drop tube is split into a pair of delivery tubes so as to apply liquid to both rows of the crop on the ground as close to the roots as the apparatus and system will allow.

Unfortunately, conventional drop systems have several problems that are disadvantageous for producers. A particular problem is that rigidity is important in the delivery tubes of the drop systems so as to maintain a proper width between them so as to apply liquid to both rows of crop at the roots. Such rigidity is problematic because it causes crop damage when the delivery tubes encounter crop rows of widths smaller than width between rows. Thus, with such rigid conventional drop systems, as they move between rows of crops, when they encounter a crop stalk for example, their rigidity damages the crop when it hits it, costing producers lost crops and in turn lost profits. Yet further, when the rigid systems hit crops or the ground during use, their drops that extend from the boom to the ground can catch, break, and/or deteriorate costing a producer time and money to repair the damaged drop.

In addition, conventional systems utilizing drop tubes on booms are not easily foldable, much less laterally foldable with the boom for compact and smooth road transport. In current systems, unfortunately, operators of the applicator systems utilizing conventional drop tubes have to get out of the cab of the tractor and remove, manually fold or roll up each drop or a number of drops from the booms so that as they fold the boom the drops do not extend vertically above the booms making it difficult, for example, to drive under a bridge or underpass because the vertical height during transport is too high. Because modern producers can have over 120 foot booms and sub booms, then such manual labor can take, in some cases, approximately six hours for set up and take down of the booms and drops.

Further, conventional drop applicators have limited horizontal and vertical movement without compromising placement of the amendment. By horizontal movement it is meant adjustment of the applicator system not driving perfectly down the row. Further, conventional drop tube systems have limited vertical movement by relying on consistent boom height to maintain proper distribution. In other words, with such conventional systems, as the drop tubes move over a hill or incline, they are too rigid and either break or wear or fail to apply an amendment where desired because they have very little room if any at all to adjust their height above ground without interrupting operations to application of liquid to parallel crop rows.

Yet further, conventional systems lack row feedback, wherein such conventional systems have virtually no capability during use to correctly apply the liquid from the drop tubes to optimal area of the crop, for example the roots.

For example, Y Drop is an existing technology that allows for product placement at approximately the base of the plant. Y drop extend a series of evenly spaced steel tubes from its booms to the ground. A tube of the liquid to be applied to the roots of a crop passes through each respective steel tube where it splits into two tubes and then passes through a mounted plastic base near ground height to separate the split tubes. The width between the tubes permits the liquid to be applied to both rows of crops on either side of the drop tube.

Unfortunately, the Y Drop system must be maintained at a relatively narrow height range in order to achieve amendment application at the base of the plant. In other words the Y drop system can vary its application height between crop rows only to a very small extent by raising or lowering its boom height. During use in the field if the contour of the field has a bump or raise in the ground, the drop tube can hit it and become damaged. Further, the structure of the Y Drop system does not permit sufficient adjustment of the width between its split hoses with narrowing width between crops. Its design permits excessive damage to the structure of the application vehicle, to the Y Drop unit itself and to the crop it hits in the field.

Another example of existing technology can be found in NutraBoss® that allows product placement at approximately the base of the plant by suspending a steel pipe with two flex points therein and an angular pivot point to pull the apparatus and distribute it through a wide steel fork drug approximately at the crop base.

The NutraBoss® system also suffers from limited vertical movement. Specifically, the NutraBoss® system must maintain the application vehicle's boom height within a narrow height range in order to maintain the correct angle for contact of the distribution apparatus with the ground. In addition, NutraBoss® also suffers from limited horizontal movement because of the angular mount of the NutraBoss® system. As the unit is moved horizontally, it changes the contact of the distribution apparatus and thus changes placement of the product within the row and does not allow for ideal following of crop rows. Further, the NutraBoss® has a rigid distribution system in the crop that makes it difficult to navigate end rows and account for variation in row width. Thus, the NutraBoss® can cause crop damage as it is driven between parallel rows of crops and is not very functional for allowing the unit to be guided by smaller crops to properly apply its liquid amendment while in use in the field.

BRIEF SUMMARY OF THE INVENTION

Embodiments of the invention address the foregoing problems discussed in conventional agricultural applicators and applicator systems.

In one aspect, an embodiment of a variable width agricultural applicator is provided for application of a liquid to the base of a crop proximate its roots as the agricultural applicator is passed between parallel rows of crops in the field. The variable width agricultural applicator includes a drop tube that extends from a boom towards the ground. The drop tubes may be spaced apart along the boom, generally the same distance as the row spacing, but offset between the rows.

The variable width agricultural applicator can be used on a conventional boom that is already equipped with spray nozzles for application of a liquid to a crop of fields. The liquid is generally sourced from a tank utilizing a pump and metering valves to supply the nozzles of the boom. In the embodiment provided, a flexible tube supplies the liquid to be applied to an inlet at one end of the drop tube. A splitter is fluidly connected at the other end of the drop tube.

The splitter splits the flow of liquid from the drop tube to a pair of spaced apart flexible delivery tubes. Each one of the pair of flexible delivery tubes has a predetermined bend so as to be able to supply the liquid to each one of the rows as the applicator is passed between parallel rows of crops in the field. The delivery tubes are flexible enough to be able to change the width between the bends when they hit a crop, without damaging the crop, but sufficiently stiff enough to maintain their predetermined bends as the width therebetween decreases.

In an embodiment, an end of the drop tube, intended for connection to the boom, is attached to a drop pivot mount assembly. The drop mount assembly includes a pair of hollow cylinders connected in a crossing fashion such that they are approximately normal to one another. One cylinder connects to the end of the drop tube and the other cylinder slides over a pivot shaft and is held in place by a pin but not held fixed in place. Instead, the drop tube is free to rotate, that is pivot about the pivot shaft during operations. This allows the drop tube to move laterally, also referred to as horizontally relative to the parallel crops in rows. The ability to freely pivot allows the drop tube to be folded for transport such that its longitudinal axis is approximately parallel to the boom or sub-booms longitudinal axis. This allows the boom to be folded with the drop tubes left on the boom. In conventional drop systems that do not pivot, the boom folds but the drop tubes do not freely pivot. Therefore, in such conventional systems, unless the drop tubes are removed they extend vertically above the booms when the boom is folded and thus such drop tubes interfere with clearance, for example, under bridges and underpasses during transport.

In an embodiment, the variable width agricultural applicator the end of the drop tube that connects to the boom is flexible and is surrounded by a break away spring to provide some rigidity. Such rigidity allows the drop tube to pivot about the end attached to boom. After the flexible portion, the drop tube includes a stainless steel portion. The end of the stainless steel portion is bent to form a bent distal end. The bend can be between 30 and 50 degrees relative to a longitudinal axis of the stainless steel portion of the drop tube. After the stainless steel portion with its bend, another flexible portion of the drop tube extends to an inlet of the splitter where the liquid is divided to exit a pair of outlets to flow through the pair of delivery tubes.

In an embodiment an inlet of the generally cylindrical splitter may include a check valve. By having the check valve at the inlet of the splitter an open system exists between the pair of delivery tubes to and the splitter to facilitate drainage of the liquid contained therein. The outlets of the splitter may contain removable orifices that allow the operator to control the amount of flow through the delivery tubes. The operator unthreads a hose barb in each outlet, places the desired orifice in the outlet and rethreads the hose barbs in to the outlet.

In another aspect, an embodiment of the invention provides a variable width agricultural applicator system to apply liquid to a crop in rows in a field, the variable width agricultural applicator system includes a boom configured to be driven though the field that may have crops in generally parallel rows in the field. The variable width agricultural applicator system includes a plurality of spaced apart variable width agricultural applicators attached to the boom. Each one of the plurality of variable width agricultural applicators includes a drop tube extending from the boom towards the ground. A flexible tube fluidly connected to a supply tank of a liquid to be applied fluidly connects to an inlet end of drop tube. At the other end of the drop tube, a splitter is fluidly connected to the drop tube.

The splitter, splits the flow of liquid to a pair of spaced apart flexible delivery tubes. Each one of the pair of flexible delivery tubes has a predetermined bend so as to be able to supply the liquid to each one of the rows as the applicator is passed between parallel rows of crops in the field. The delivery tubes are flexible enough to be able to change the width between the bends when they hit a crop, without damaging the crop, but sufficiently stiff enough to maintain their predetermined bends as the width therebetween decreases.

In an embodiment, the variable width agricultural applicator system can include a plurality of brackets for attaching the plurality of variable width agricultural applicators to the boom. Each one of the brackets includes a pivot shaft extending proximately normal to a longitudinal axis of the boom so as to receive a cylindrical sleeve of the drop tube. Such brackets allow for spacing of the drop tubes such that such spacing can be driven by the width between the crop rows and not by the width between the nozzles on the boom. Further, such brackets with the pivot shaft allow for the drop tube to freely pivot thereon.

In an embodiment, the variable width agricultural applicator system can include a sub-boom attached to the boom. The sub-boom can be attached to the primary boom or to the secondary booms or both. Use of the sub-booms in the system facilitates use of the drop tubes in such instances where the sub boom is in front of the tractor. Because the drop tubes are long and flexible, by mounting the drop tubes on the sub-boom instead of the main boom in front of the tractor then the operator removes the danger of having the drop tubes get caught under the front of the tractor because the sub-boom spaces them a greater distance away from the tractor than if they were mounted on the boom. This same principal is applicable where the primary boom and sub-boom are mounted or towed at the rear of the tractor.

Further, where a sub-boom is utilized then the sub-boom can be equipped with a rotating shaft that extends along its longitudinal axis and is powered by the tractor. The rotating shaft maybe geared to mesh with a gear on each one the plurality of brackets that are used to mount each one of the drop tubes. Thus, rotation of the shaft in the sub-boom by the operator in the cab of the tractor can rotate the gear of each one of the brackets to pivot the drop tube to and from a stored position along the sub-boom. The stored position is generally one where the longitudinal axis of the drop tube is generally parallel to the longitudinal axis of the sub-boom.

In an embodiment as the boom and/or sub-boom is folded, the drop tubes are free to pivot to a position wherein their longitudinal axis is parallel to the boom and/or sub-boom longitudinal axis. A catch located on each one of the plurality of brackets can catch the drop tube next to is to keep the drop tube in the parallel position.

In yet another aspect of the invention, an embodiment of an agricultural applicator is provided which relocates application from a nozzle on conventional boom to a spray tip at a position higher than the boom. As the boom moves through a field of crops the crops are bent over and the spray tip above the boom is able to direct the liquid to the foliage opened up by the boom. The agricultural applicator conveniently attaches to the conventional boom via a quick connect base which may be magnetic. Adjustments are provided to adjust the height and the direction of spray of the nozzle tip to the crops.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
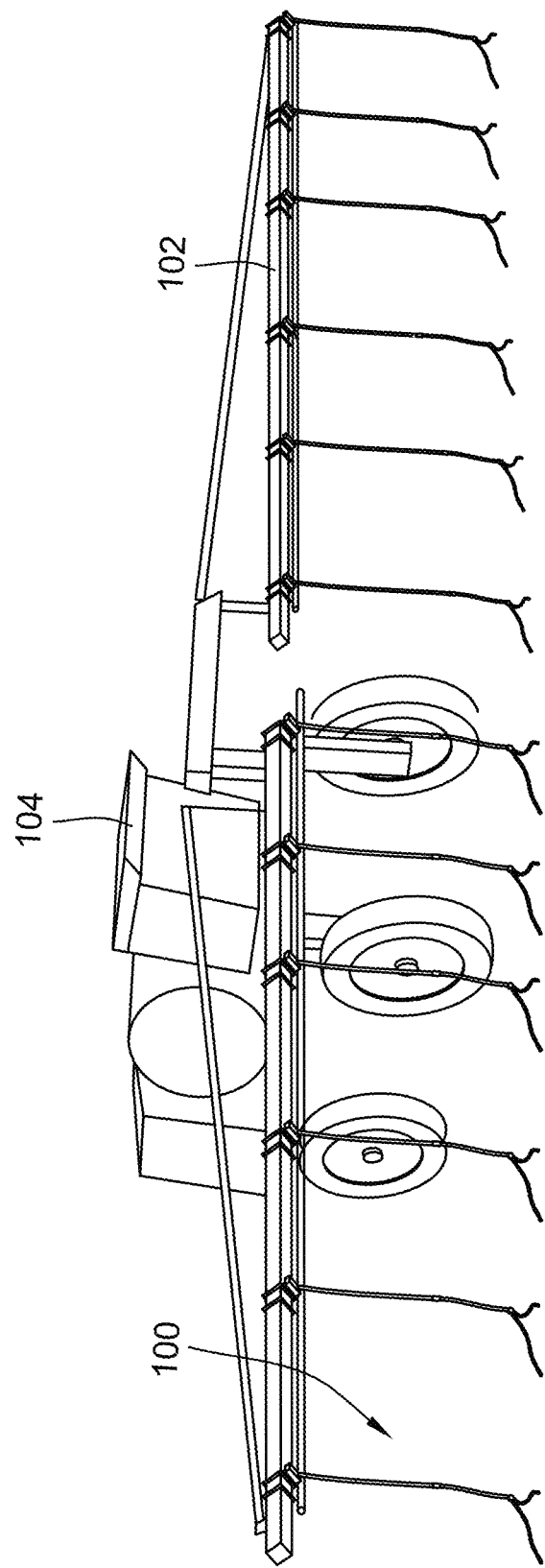
FIG. 1 is a perspective view of an embodiment of an agricultural applicator on a boom driven by a vehicle according to the teachings of the instant application.

Turning now to the drawings, there is illustrated in FIG. 1 an exemplary embodiment of a variable width agricultural applicator 100 attached to a boom 102 to apply liquid to a crop in rows. While such an exemplary embodiment will be utilized in describing various features and advantages of embodiments of the invention, such a description should be taken by way of example and not by limitation. Indeed, advantages of embodiments of the invention can be used to improve delivery of a liquid to a crop in rows where it is desirable for a vehicle 104 to travel between parallel rows of a crop to apply the liquid. It can be readily appreciated from FIG. 1 that the boom carries a plurality of a variable width agricultural applicators 100 spaced to be located between rows of crops in the field.

Figure 2:
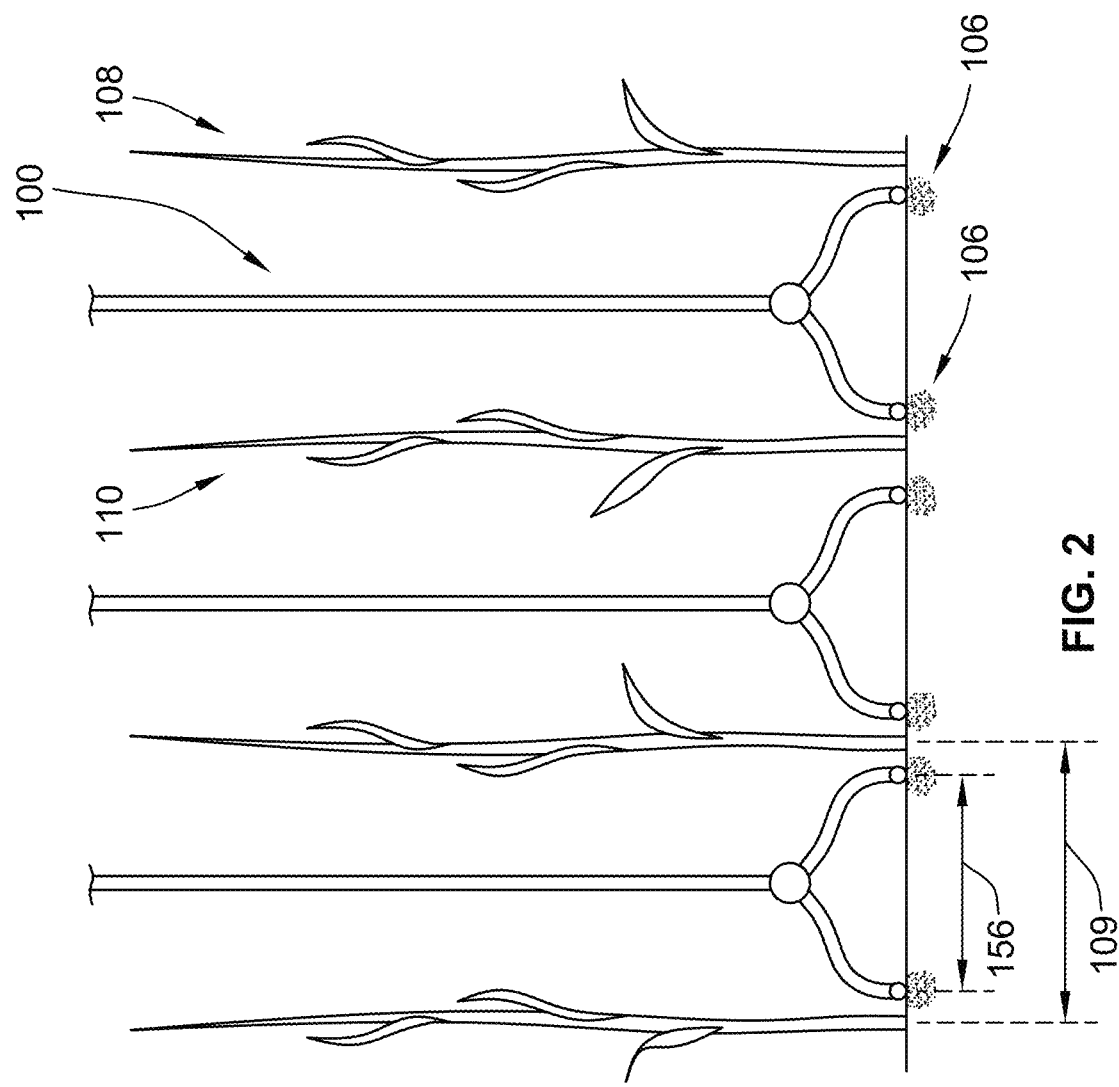
FIG. 2 is a perspective view the agricultural applicator of FIG. 1 moving between parallel rows of crops as it applies liquid to the base of the crop.

FIG. 2 illustrates the variable width agricultural applicator 100 in use as it applies liquid 106 to the base of a parallel rows of crop 108, 110 defining a row width 109 between the parallel rows of crops 108, 110. It can be readily appreciated that while the row width 109 can be generally uniform, at times the row width 109 deceases such that it is desirous for the variable width agricultural conveyor 100 to decrease its width 156 to still be able to apply the liquid 106 to the base of the parallel rows of crops 108, 110 and not merely impact and damage the crops because of its rigidity. Indeed, as will be discussed, variable width agricultural applicator 100 is flexible enough to decrease its width 156 and not destroy crops.

Figure 3:
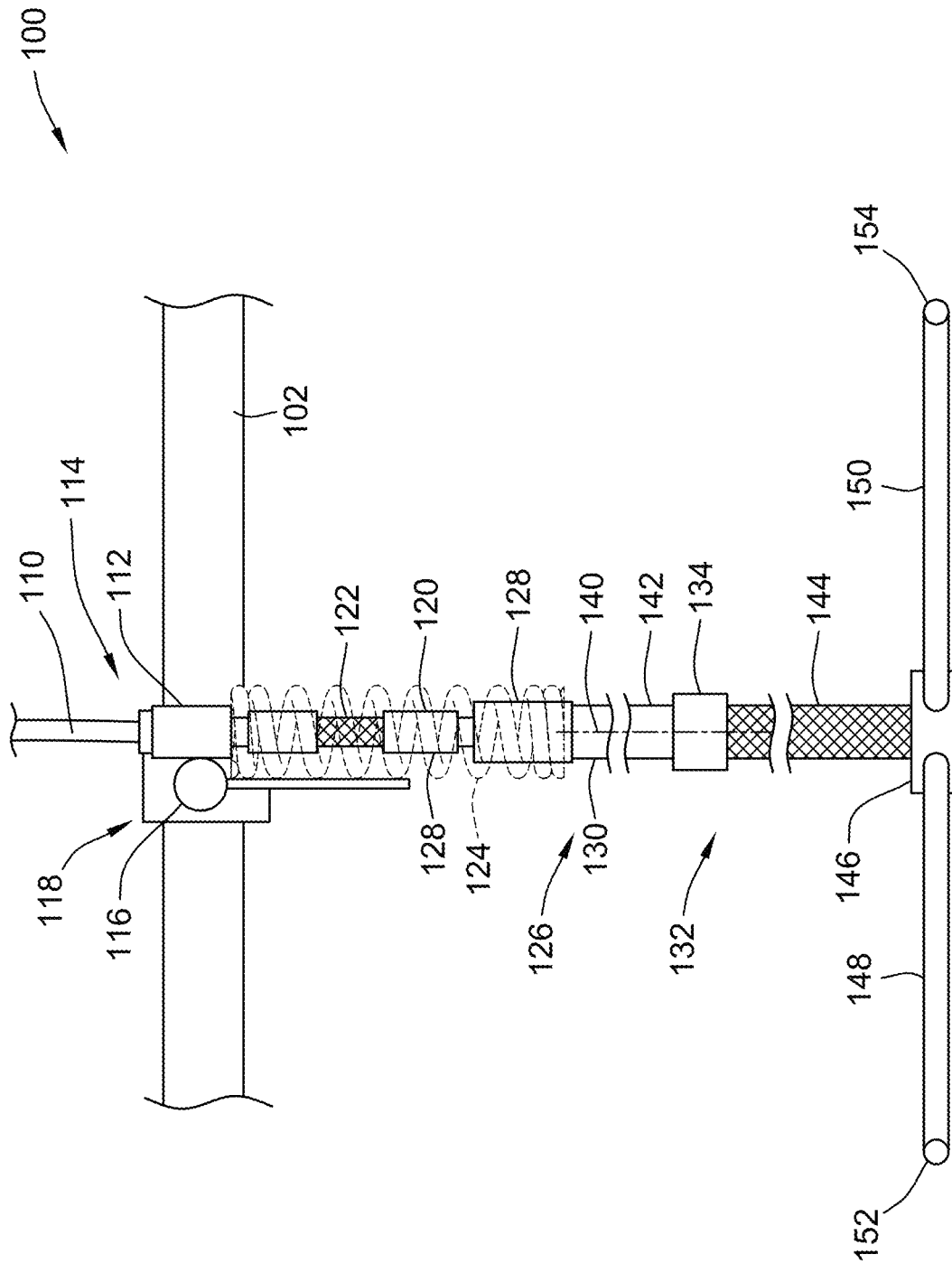
FIG. 3 is a schematic rear view of the agricultural applicator of FIG. 1.

FIG. 3 illustrates a schematic side top view of the variable width agricultural applicator 100 of FIG. 100. A supply line 110 carries the liquid 106 from a supply tank (not illustrated) of the liquid 106 under pressure to the variable agricultural applicator 100. The supply line 110 is semi-flexible rubber hose with basic corrosive resistance. More specifically, the supply line 110 connects to a standard TeeJet® nozzle body (not illustrated) or similar nozzle found on conventional booms with a standard adapter and hose barb. Such booms are also referred to as wet booms because they are structurally able, via pvc pipe for example, to carry liquid that exits the pipe via supply lines to feed the nozzles. Accordingly, once the supply line 110 is connected to the TeeJet® nozzle body the liquid no longer exits the boom 102 via the nozzles but instead is ported to the variable width agricultural applicator 100.

The supply line 110 connects to a stainless or plastic ⅜" hose barb×½" MPT adapter that is threaded into coupler 112 of drop tube 114. Coupler 112 is a ½" FPT high pressure stainless steel bar stock coupler.

Coupler 112 is welded to a drop mount sleeve 116 of a drop pivot mount assembly 118 in a perpendicular orientation so that the two bisect each other, making a cross. The drop mount sleeve consists of a 2 inch long section of 1" OD×0.76" ID×0.120" wall 304 stainless steel tube. In an embodiment, as illustrated, the drop pivot mount assembly 118 may include fork 120 that may be mounted on the opposite side of the drop mount sleeve 114. The fork 120 may be made up of two ⅜" stainless steel rods bent to follow the curve of the drop mount sleeve 114 and welded to the drop mount sleeve 116 approximately ¾" apart.

The pivot mount assembly 118 attaches to a first hydraulic hose 122. The first hydraulic hose 122 is of relatively short length and is approximately ½" diameter. The first hydraulic hose 122 is flexible and has stainless steel non swivel ends. The first hydraulic hose 122, as illustrated is inside of a break away spring 124. The hydraulic hose 122 is threaded into a second coupler 128 of a rigid portion 126 of the drop tube 114. The second coupler 128 is a weld on NPT coupler that is welded to a piece of ¾ OD×0.065 W 304 stainless tube 130 that varies in length depending on the application and extent needed extend from the boom 102 depending on the range of heights available with the boom 102. In other words, tractors vary in size. A tractor that that has a boom higher than another smaller tractor may require longer lengths of stainless steel tube 130. The liquid 106 then enters into the first hydraulic hose 122 such that the liquid 106 directly contacts the first hydraulic hose 122.

At the distal end 132 of the rigid portion 126, a third coupler 134 is attached via weld. The third coupler 134 is ¼" FPT. The third coupler 134 connects the rigid portion 126 of the drop tube 114 to a second hydraulic hose 144. The second hydraulic hose 144 may be ⅜ inch diameter hydraulic hose that can vary in lengths depending on the operational needs. The second hydraulic hose 144 may have stainless ends. A first end is threaded into the third coupler 134.

The second hydraulic hose 144 at a second end is attached to a splitter 146. Splitter 106 divides the liquid 106 into a first flexible delivery tube 148 and a second delivery tube 150 to apply the liquid 106 out of the first and second outlets 152, 154 to the first and second rows of crops 108, 110.

Figure 4:
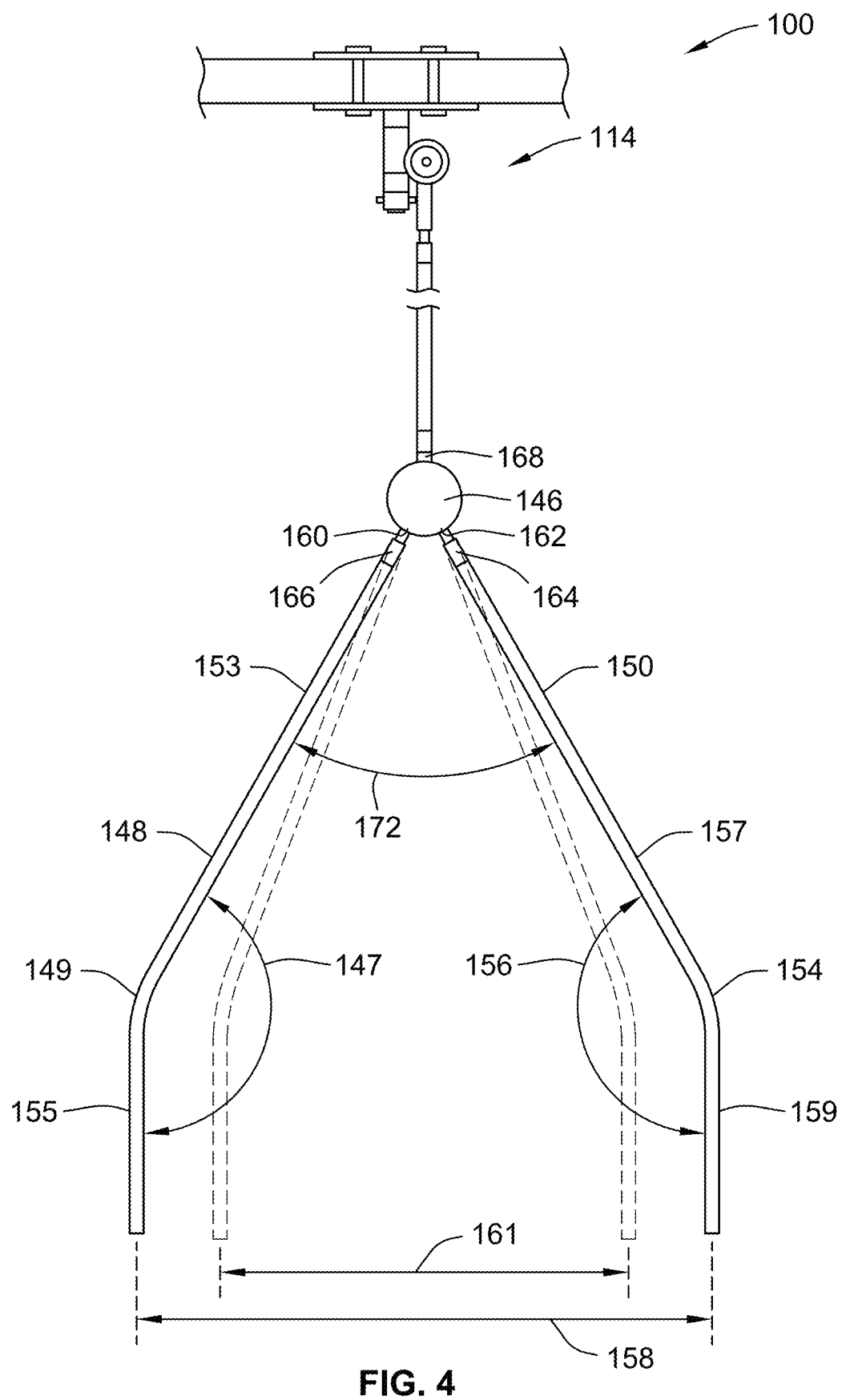
FIG. 4 is a schematic top view of the agricultural applicator of FIG. 1.

Turning now to FIG. 4, FIG. 4 illustrates the first and second flexible delivery tubes 148 and 150 in further detail. The first and second flexible delivery tubes 148, 150 are thermoformed semi-flexible plastics that have been bent along their lengths to form a first bend 149 and a second bend 151 respectively. First bend 149 divides the first delivery tube 148 into a first upstream portion 153 and a first downstream portion 155. The first bend 149 defines a first application angle 147 of between 110 and 170 degrees between its first upstream portions 153 and first downstream portion 155. In a preferred embodiment the application angle 147 is between 120 and 165 degrees and in a more preferred embodiment the application angle 147 is between 130 and 160 degrees.

Second bend 150 divides the second delivery tube 150 into second upstream portion 157 and second downstream portion 159. Second bend 150 defines a second application angle 156. The first and second application angles 147, 156 are equal to one another. This in an embodiment the second application angle 147 is between 110 and 170 degrees. In a preferred embodiment, the second application angle 156 is between the between 120 and 165 degrees and in a more preferred embodiment the application angle 156 is between 130 and 160 degrees.

The application angles 147, 156 define a first width 158 between the bends 147, 156. Thus, the operator chooses the first and second delivery tubes 148, 150 having the predetermined bends 147, 156 based upon the row width 109 (FIG. 1). However, even with such choice, at times the row width 109 (FIG. 1) can vary even with seemingly uniform rows. Accordingly, because of the flexibility of the first and second delivery tubes 148, 150, even with their predetermined bends 147, 156, upon impact of the crop in rows upon the first and second upstream portions, the first distance 158 can decrease to a second width 161. The broken lines in FIG. 4 indicated the movement of the first and second delivery tubes 148, 150 to define the second width 158 which is less than the first width 156. Thus, impact by the first and second delivery tubes 148, 150 does not damage the crops and the delivery of the liquid to the crops generally remains at the base of the crop.

The first and second flexible delivery tubes 148, 150 are both the same length but because they can be changed out, the overall lengths can vary to accommodate the desired application. Indeed the first and second flexible delivery tubes 148 and 150 connect the splitter 146 at outlets 160, 162 via hose barbs 164, 166. In an embodiment the outlets 160, 162 form a splitter angle 172 between 30 and 80 degrees. In a preferred embodiment the splitter angle 172 is between 40 and 75 degrees and in a more preferred embodiment, the splitter angle 172 is between 45 and 65 degrees. As with the interchangeability of the first and second delivery tubes 148, 150, splitter 146 can be chosen with a predetermined splitter angle 172 to accommodate various row widths between crops.

Figure 5:
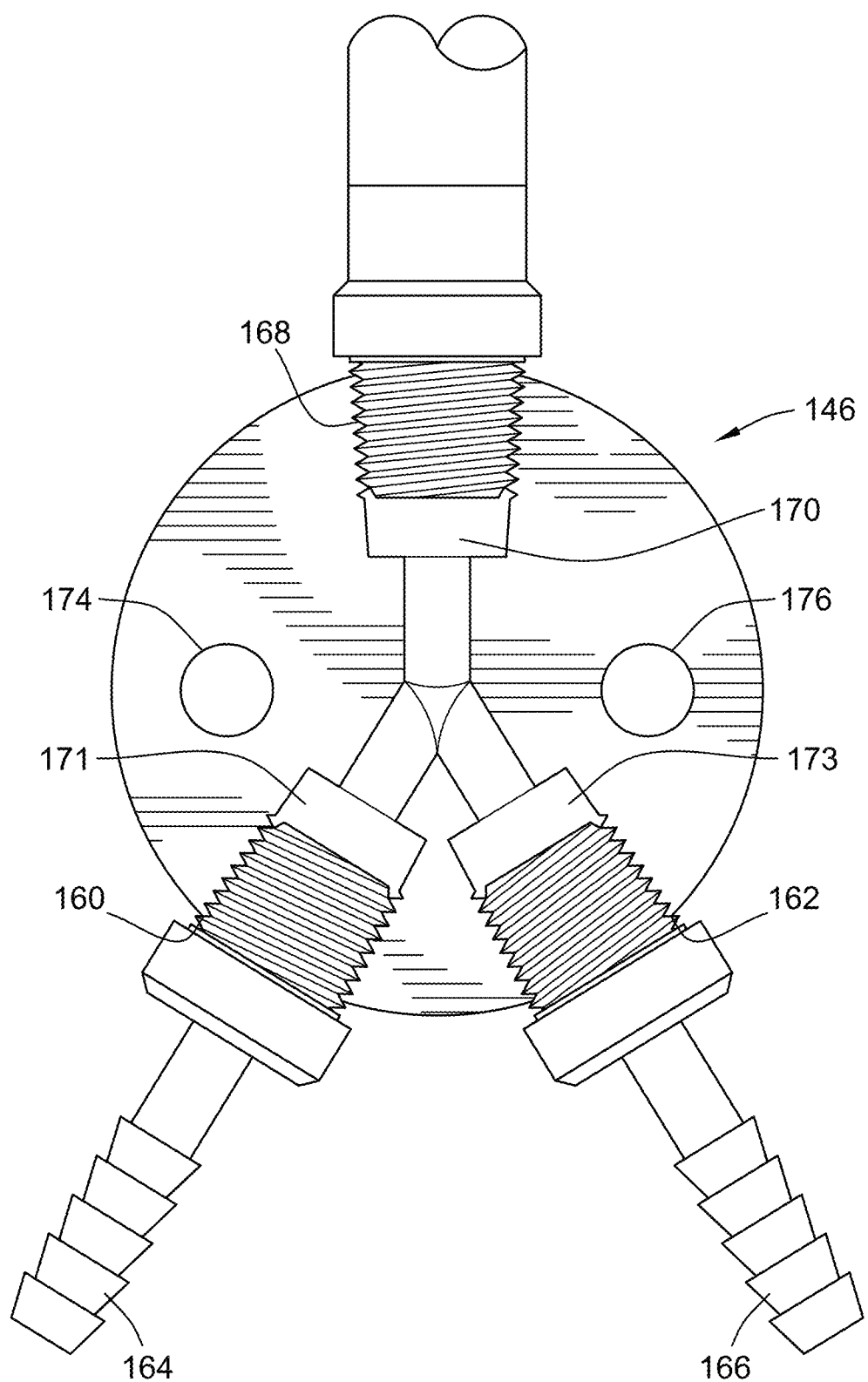
FIG. 5 is a perspective view of splitter of the agricultural applicator of FIG. 1 with a top portion removed.

FIG. 5 illustrates the splitter 146 in further detail as a top portion is removed to see the internal features inside the splitter 146. Splitter 146 is a short section of approximately 2.5" diameter stainless round stock with an inlet 168 that is threaded to receive the third coupler 134. The inlet 168 is fluidly connect to the outlets 160, 162. The inlet 168 further includes a check valve 170 that acts to prevent unpressurized liquid from entering the splitter 146 and to allow for an open loop system to allow the liquid to drain out from any structures below the check valve 170. The outlets 160, 162 are threaded so as to receive the hose barbs 164, 166. Splitter 146 also includes apertures 174, 176 defined by the splitter 146. The apertures 174, 176 do not penetrate the sealed area for the liquid as it passes from the inlet 168 to the first and second outlets 164, 166. The apertures 174, 176 facilitate machining the splitter 146, can be used to control the weight of the splitter 146, can attach an adapter (not illustrated) to increase the width between the first and second delivery tubes 148, 150 (FIG. 4) and can facilitate storage.

Orifices 171, 173 may be placed at the outlets 160, 162 to control flow therethrough. The orifices 171, 173 may be changed out with other orifices of other diameters to depending on the operational needs. The orifices 171, 173 may be changed out by unthreading the hose barbs 164, 166 out of the outlets 160, 162, inserting the new orifices and rethreading the hose barbs into the outlets 160, 162.

Figure 6:
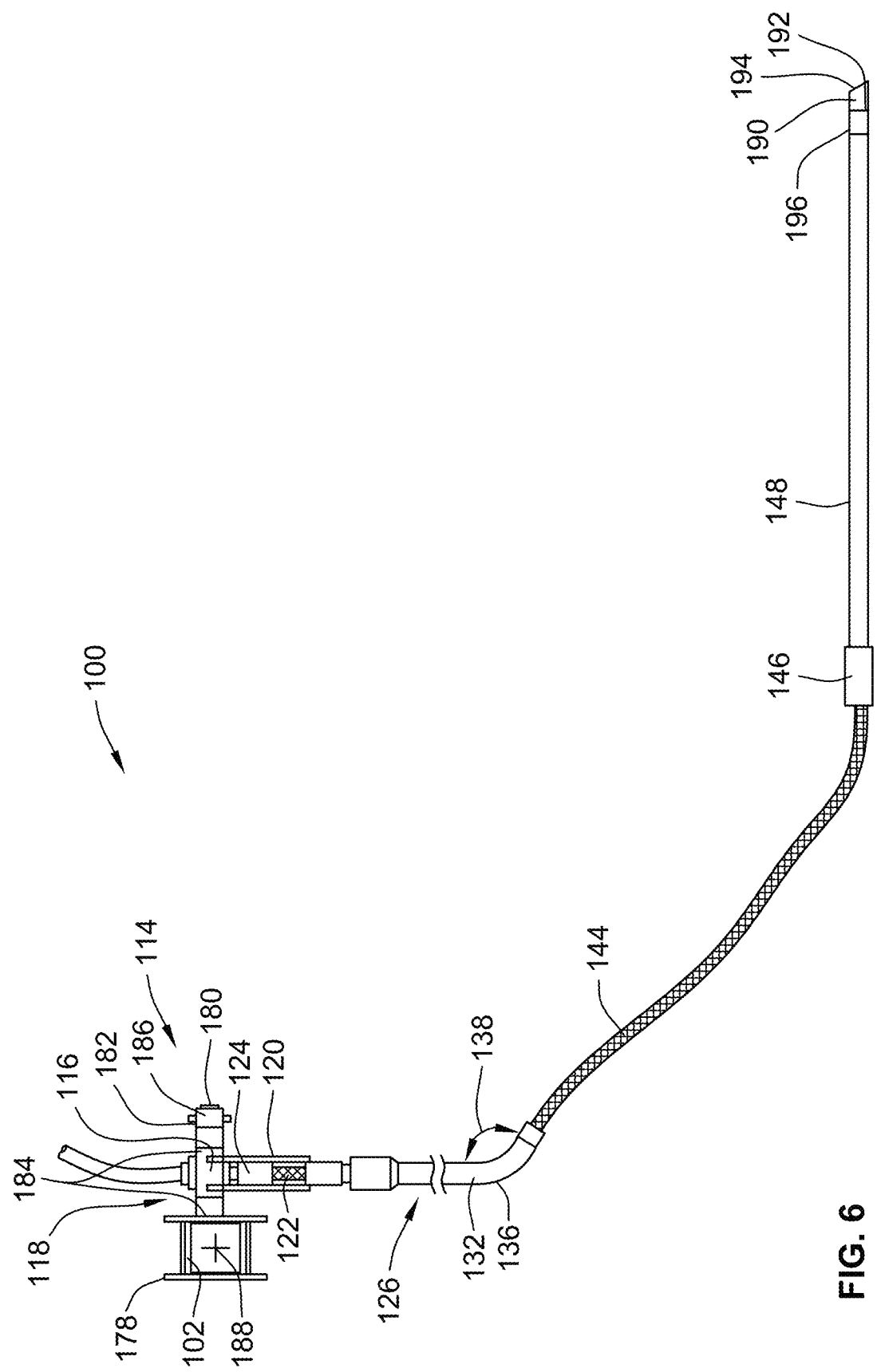
FIG. 6 is schematic side view of the agricultural applicator of FIG. 1.

FIG. 6 illustrates a side view of the variable width agricultural conveyor 100. A bracket 178 includes a pivot shaft 180 for slidingly receiving the drop mount sleeve 116. Bushings 184 facilitate the drop mount sleeve's 116 reception on the pivot shaft 180. A retainer bushing 186 is also used on the pivot shaft 180 to permit reception of the drop mount sleeve 116. A lynch pin 182 through the retainer busing and shaft holds the drop mount sleeve 116 in place such that the drop tube 114 is free to pivot in and out of the page so as to become parallel if need be for transport to a central boom axis 188.

The rigid portion 126 at the distal end 132 is bent to produce a bend 136 (FIG. 5) using a tube bender to create an angle 138 (FIG. 5) between 15 and 60 degrees relative to a central longitudinal axis 140 through a straight portion 142 of the rigid portion 126. In a preferred embodiment, the angle 138 (FIG. 5) is between 25 and 55 degrees and in a more preferred embodiment, the angle 138 (FIG. 5) is between 35 and 45 degrees. Bend 136 prevents damage to the rigid portion 126 of the drop tube 114 because it places the second hydraulic hose 144 into position to absorb changing topography of the fields. For example if a bump is encountered the bend 136 permits the second hydraulic hose 144 to absorb the impact rather than damage the drop tube 114 or its connections via the drop tube mount assembly 118 at the boom 102.

Also, an embodiment of the first delivery tube 148 is illustrated wherein instead of the check valve 170 being present in the splitter 146 it is found as a stainless steel check valve 190 with orifices 192 and deflector 194 attached via hose barb 196 that allow for maintaining pressure avoid dribbling liquid after shut off and keep the liquid aimed down at the base of the plant to avoid damage.

Figure 7:
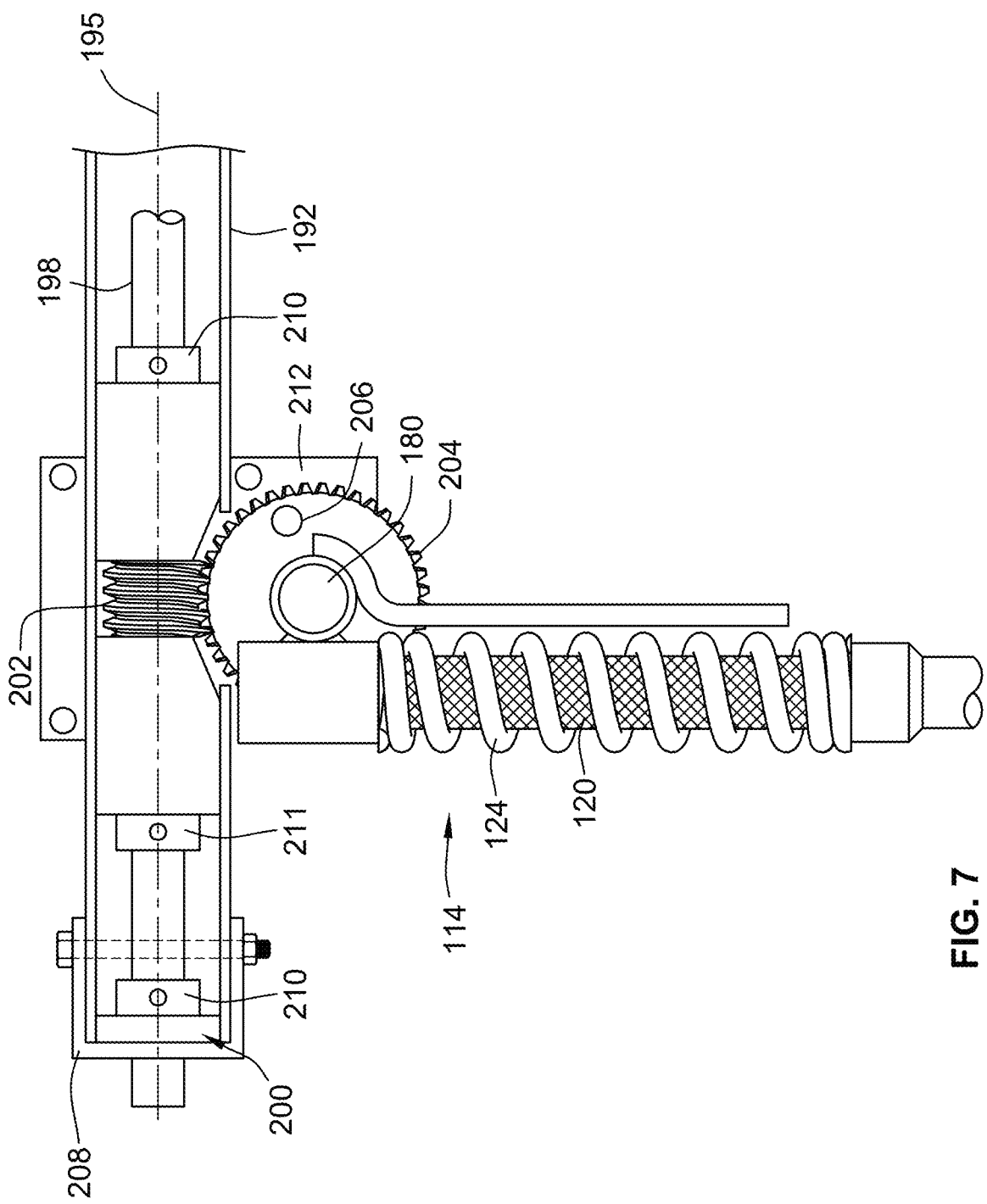
FIG. 7 is a schematic view of an automatic folding mechanism for the agricultural applicator of FIG. 1.

FIG. 7 illustrates the drop mount sleeve 116 telescopes over the pivot shaft 180. Pivot shaft 180 maybe be ¾" to attach and detach the drop tube 114 from the bracket 178. The bracket 178 is designed to stay on the boom 102 throughout the season but can be adjusted left and right and are removable with 4 bolts. The bracket 178 includes two rectangular pieces of flat steel with bolt holes in the 4 corners. One side has a ¾" hole centered horizontally, with the bottom of the hole even with the bottom of the boom. The two pieces are attached via bolts sandwiching the boom 102 in between.

The bracket 180 is therefore a mounting bracket. It is attached directly to the existing boom 102. The pivot shaft 180 is inserted into the ¾" hole of the bracket 178 and plug welded on the inside then ground flush if necessary for proper fitment to the boom 102. The bracket 178 can be mounted with the pivot shaft 180 facing towards the front of the tractor 104 (FIG. 1) or the back depending on the application. The two rectangular pieces of the bracket 180 are then bolted to one another with the boom 102 sandwiched between them. Each drop tube 114 has its own bracket for attachment to the boom 102.

Each drop tube 114 is then slid over the pivot shaft 180 with bushings 184 on each side of it. The bushings 184 are held onto the shaft with a lynch pin 182 that is inserted into a retainer bushing 184 that has a hole drilled through it once it is lined up with a corresponding hole in the pivot shaft 180. The retainer bushing 184 may be fitted with a retainer rod 190 (FIG. 8) for automatic fold systems (to be discussed) that protrudes out and up to help catch and hold the drop tube 114 for transport mode.

Figure 8:
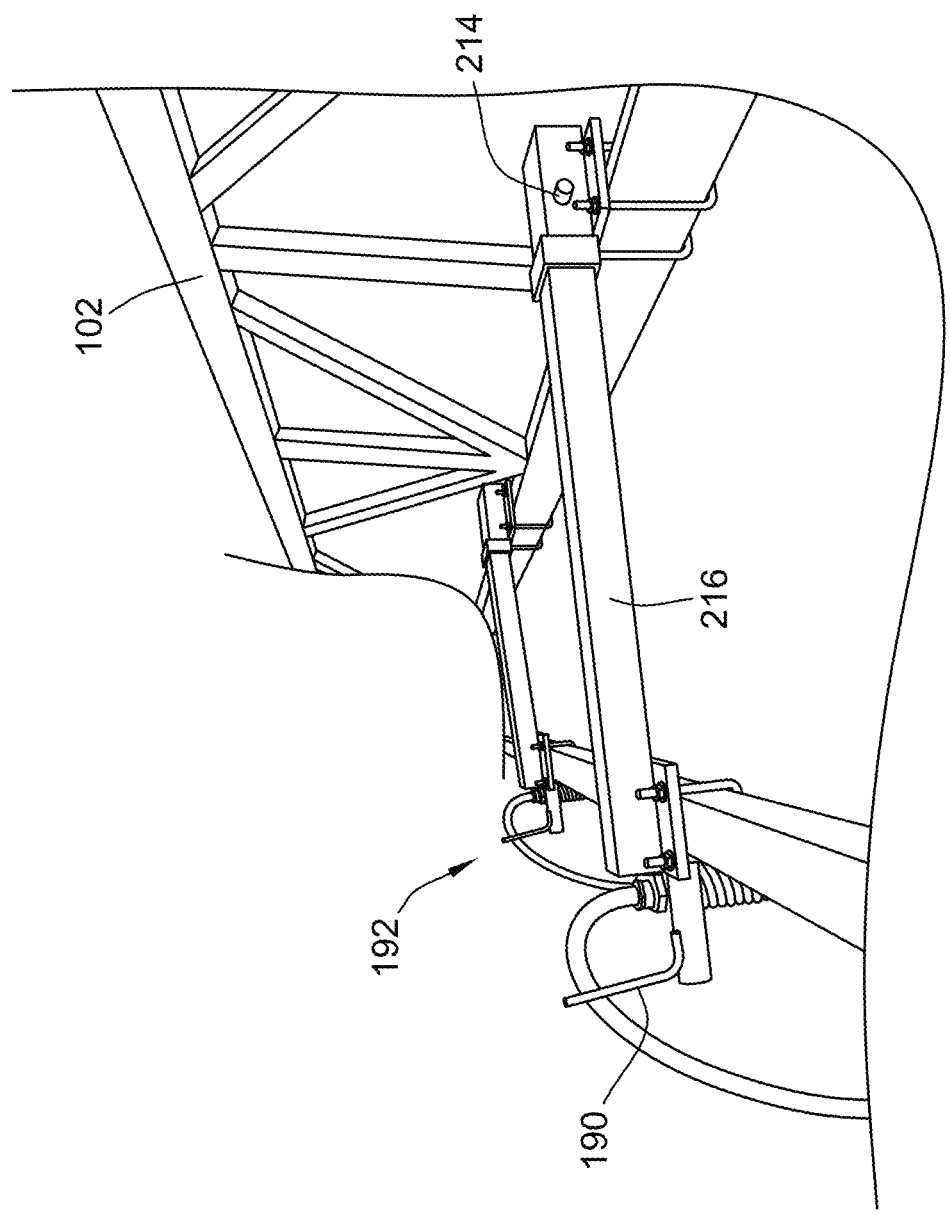
FIG. 8 is a perspective view of a sub-boom for the agricultural applicator of FIG. 1.

FIG. 7 illustrates the variable width agricultural applicator 100 utilizing a sub boom 192 attached to the boom 102 (FIG. 8). In the embodiment, an auto fold mechanism 194 is used to facilitate positioning of the drop tubes 114 for transport. With the auto fold mechanism 194 the drop tubes 114 are still attached to the sub boom 192 during transit to or from the field before or after operations. The operator from the cab can automatically store the drop tubes 114 into position for transport. It should be noted that even without the auto fold mechanism 194 the drop tubes 114 can be left on the sub boom and will pivot into a storage position as the boom 102 and sub booms 192 fold. During transit the drop tubes 114 are stored in a position parallel to the longitudinal axis 195 of the sub-boom 192.

Still with respect to FIG. 7. The sub boom 192 includes a shaft 198. The automatic folding mechanism 194 can include the pivot shaft 180 with bushings 200 and worm gears 202 that rotate inside of the sub boom 192 driving worm wheel 204 with a member 206 protruding out of them to engage the support fork 120 and fold the drop tube 114 for transport mode. While worm gear 202 and worm wheel 204 are illustrated, it can be readily appreciated that in other embodiments a chain drive may be used and in yet others a rack and pinion type arrangement to name a few non limiting examples. Also, in an embodiment the support fork 120 is not needed where poly reinforcement has been added to the first hydraulic hose 122 (FIG. 3) to increase its rigidity together with the breakaway spring 120 such that there is sufficient rigidity to rotate the entire drop tube 114.

The sub-boom 192 is of lengths of thin walled 1.5" square tube with rectangular holes laser cut in one of the 4 faces every 10 inches, starting centered 5" in, allowing a space for the worm gears 202 to mesh. The sub boom 192 is then mounted to the existing boom 102 (FIG. 8) with basic industry methods using telescoping tube, U-bolts and locking pins. The sub boom 192 sections are connected to one another using sub-boom couplers. Sub-boom couplers consist of short lengths of telescoping tube that fit over the ends of the sub-boom sections. The sub-boom sections can be fastened with bolts or the sub booms sections can be welded making one solid sub-boom 192 the length needed for each solid section of the spray boom on a given sprayer.

Each end of the sub-boom 192 is capped with a cap 208. The cap 208 is a square piece of steel with a hole in the center to allow the shaft 198 access and prevent lateral movement of the shaft 198. The cap 208 is welded to the end of a sub-boom coupler and bolted to the sub-boom 192. The shaft 198 is held in position by bushings 200 also referred to as poly bushings 200, lock collars 210, 211 and or roll pins as well as the tube caps 208. The poly bushings 200 may also be fastened through the tube wall with screws or bolts if necessary. A variety of power sources can be used to power the shaft 198, for example hydraulic, pneumatic and electric with the use of motors and pulleys, gears or direct drive depending on the application.

A mounting bracket 212, similar to the bracket 178 (FIG. 6) includes two pieces of flat steel. Mounting bracket 212 must be wide enough that the bolts do not interfere with the worm wheel 204. The mounting bracket 212 has the pivot shaft 180 attached to the back bracket extending out below the sub boom 192 allowing the fitment of the worm gear 202 centered below the sub-boom 192. The pivot shaft 180 is ¾". The mounting bracket's 212 forward mount will also have the forward bushing welded to a small section of the mounting bracket 212 that provides additional rigidity to keep the gears properly meshed. As the worm gear 202 rotates the member 206 which protrudes from the worm wheel 204 and engages and pushes the support fork 120 causing the entire drop tube 114 to fold parallel to the sub-boom 192 or beyond. As previously discussed, in embodiments, the support fork 120 is not needed where poly reinforcement has been added to the first hydraulic hose 122 (FIG. 3).

FIG. 8 illustrates the sub-boom 192 attached to the boom 102. Pins 214 can be easily removed to disconnect receiver arms 216. Retainer rods 190 facilitate storage of the drop tubes 114.

Figure 9:
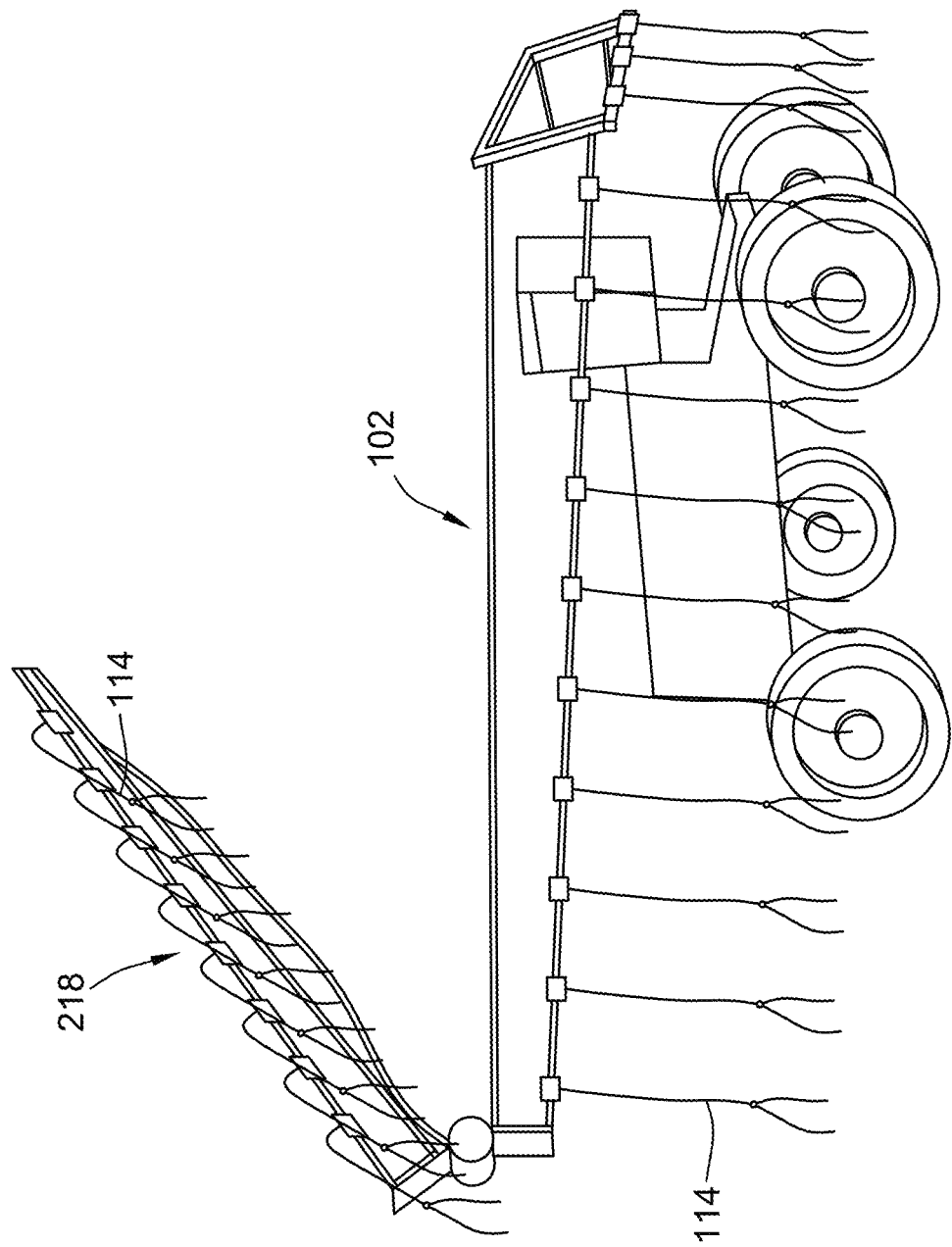
FIG. 9 is a perspective view of a folding boom including the agricultural applicator of FIG. 1.

FIG. 9 illustrates the drop tubes 114 in a first fold section 218 of the boom 102 as it folds. The drop tubes are able to pivot to become nearly parallel to the boom 102 without the operator having to leave the cab.

Figure 10:
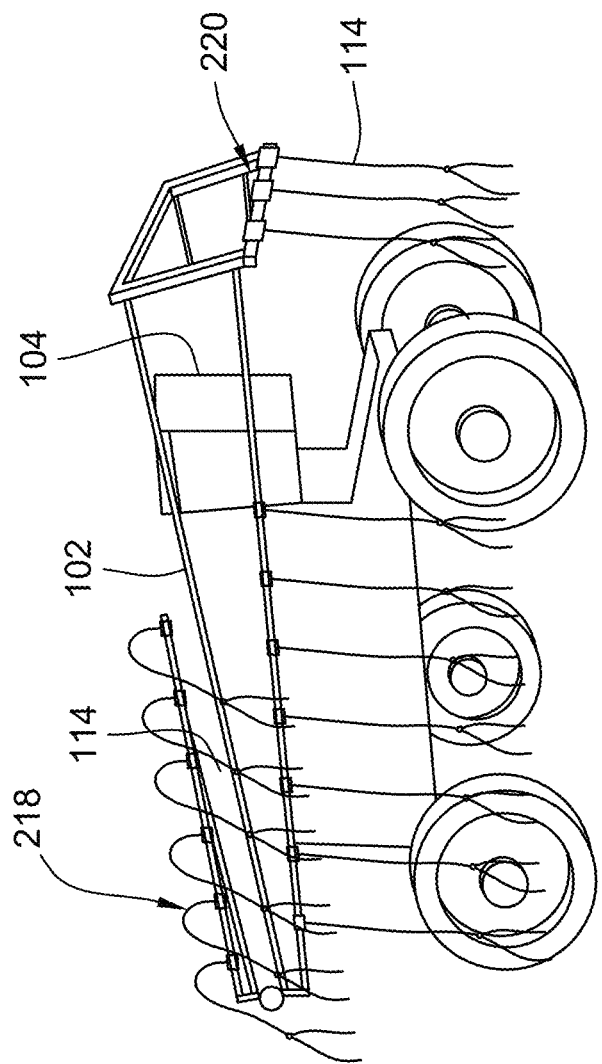
FIG. 10 is a perspective view of the folding boom in a transport position including the agricultural applicator of FIG. 1.

FIG. 10 illustrates the boom 102 in position for transport. As can now be readily appreciated the drop tubes 114 in the first fold section 218 are stored nearly parallel to the boom 102. The drop tubes 114 are stored in a vertical position at the second foldable section 222 of the boom 102 as are the drop tubes 114 at the front 220 of the boom 102. The ability to easily fold the drop tubes 114 for transport as illustrated in the first fold section 218 (and the opposite section, on the other side of the vehicle 104) cuts down considerably on the labor costs involved in the time and personnel it takes to prepare the vehicle for transport to and from a field for applying liquid to a field of crops.

Figure 11:
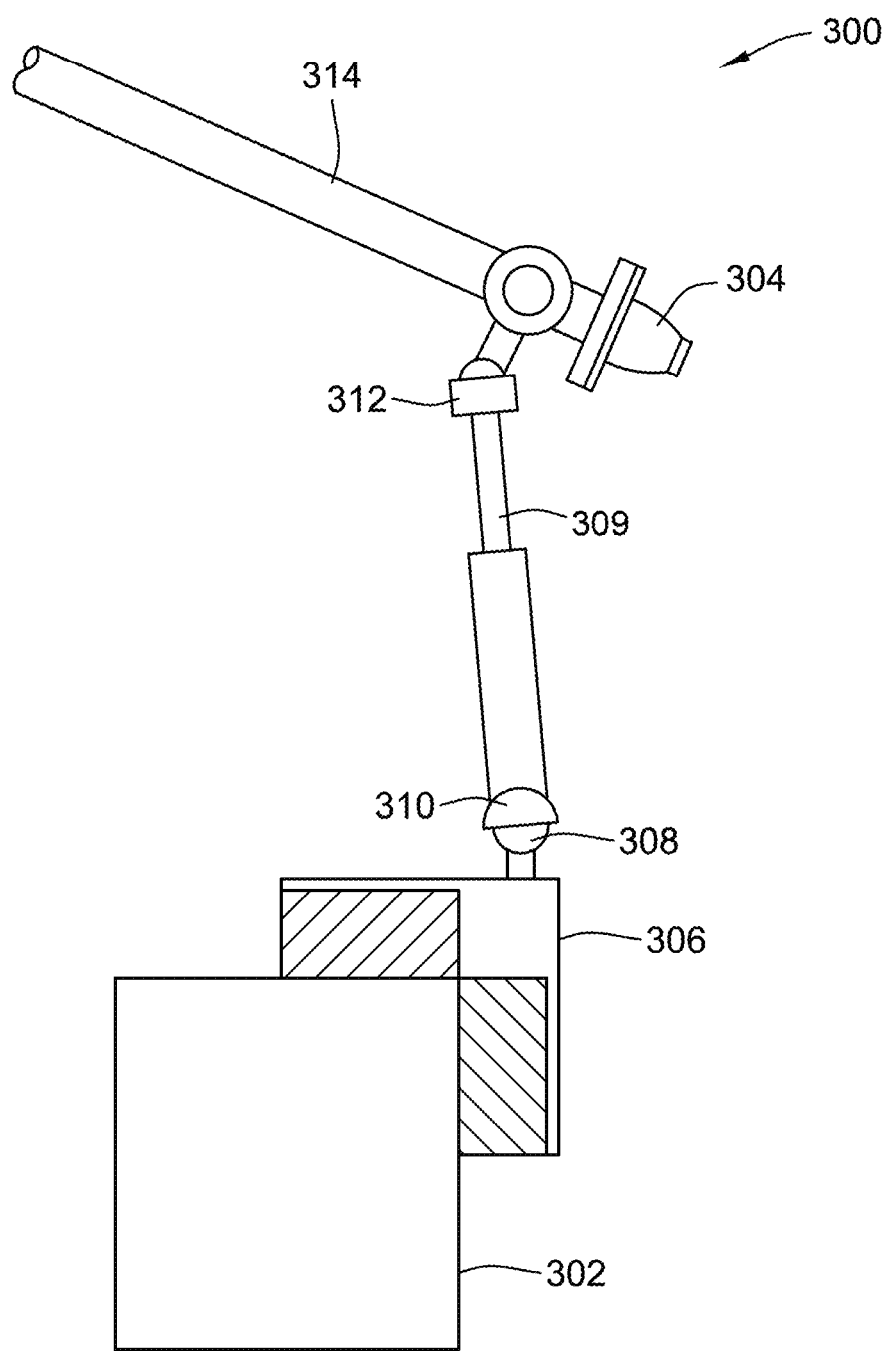
FIG. 11 is a schematic view of another embodiment of an agricultural applicator according the teachings of the instant application.

FIG. 11 illustrates another embodiment of an agricultural applicator 300. The Agricultural applicator 300 is attached to a boom 302 or to a sub-boom. Typically, as discussed above, conventional booms 302 have nozzles proximate the bottom of the boom 302 to apply/spray liquid on crops. The nozzle locations on the boom 302 do not allow the boom 302 to get above the crop canopy at some crop heights. Further, it also does not allow vehicles employing the boom 302 to use the boom 302 to move the canopy. In other words, typically as the boom 302 impacts crops as it moves through a field this can be advantageous because it bends the crop, opens up the canopy over the crop and allows the applied liquid to reach more of the crop foliage.

The agricultural applicator 300 relocates application from a nozzle on the boom 302 to a spray tip 304 at a position higher than the boom 302. As the boom 302 moves through a field of crops the crops are bent over and the spray tip 304 is above the boom 302 on the agricultural applicator 300 are able to direct the liquid to the foliage opened up by the boom 302. One can readily appreciate that the boom 302 may have and agricultural applicator 300 at each nozzle position on the boom 302.

By extending the spray tip 304 to the correct height above the boom 302 and by allowing the spray tip 304 to be angled at the correct angle to penetrate the crop canopy within the turbulence created by the crop as it springs back up from being pushed by the boom 302, better crop coverage and penetration than any other application system is achieved.

A difference between conventional booms 302 and their use with the agricultural applicator 300 is its ability to use the existing boom 302 to move the crop canopy while applying foliar amendments above the crop at the ideal height and angle due to its adjustable positioning mechanisms that moves the spray tips 304 well above the boom 302. Each spray tip 304 receive the supply of liquid to be applied to the crop via a hose 314. The hose 314 may be a push connector hose to allow for easy installation.

The agricultural applicator 300 includes a magnetic base 306 for attachment to the boom 302. However, as can be appreciated other mounts including clamps and fasteners may be used by way of non-limiting examples. The agricultural applicator 300 includes a first locking ball 308 and socket joint 310 proximate the magnetic base 306. A telescoping tube 309 extends from socket joint 310 to a positional adjustment ball 312 attached to the spray tip 304. These features allow for positioning as well as spacing independent from the pre-existing nozzles on the boom 302. The adjustments provided by the features allow vertical and horizontal position to be set by the operator for ideal spray distribution.

Optional components include tanks mounted by saddling existing sprayer tanks allowing placement of an additional tank on existing sprayers with minimal mounting problems. Other items will be spray pumps and control valves with harnesses that tee into existing sprayer control to tandem off of existing section control or as stand-alone control systems.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

What is claimed is:

1. An agricultural applicator comprising:
   a boom;
   a plurality of boom nozzles extending along the boom;
   a plurality of spray nozzles comprising a first spray nozzle located at a first axial end of the boom and a second spray nozzle located a second axial end of the boom and a remaining plurality of spray nozzles located between the first spray nozzle and the second spray nozzle, each one of the plurality of spray nozzles connected with a hose to one of the plurality of boom nozzles, wherein liquid is ported from the boom nozzle to the hose, each spray nozzle comprising:
   a spray tip located gravitationally above the boom;
   a base connected to the boom;
   a telescoping tube-shaped member,
      the telescoping tube-shaped member extending between the spray tip and the base, the telescoping tube-shaped member having three degrees of freedom of movement at a first end proximate the respective one of the plurality of bases.

2. The agricultural applicator of claim 1, wherein each spray tip is independently adjustable to raise or lower its height above the boom.

3. The agricultural application of claim 2, wherein the height of any spray tip may be different than the height of any other spray tip.

4. The agricultural applicator of claim 1, wherein each spray tip is independently adjustable to change a spray angle at which each spray tip applies a fluid to a crop, the spray angle measured from vertical to a longitudinal axis of the spray tip extending through an outlet of the spray tip.

5. The agricultural applicator of claim 1, wherein each spray tip is independently adjustable relative to an adjacent spray tip to increase or decrease a width therebetween.

6. The agricultural applicator of claim 5, wherein the width between adjacent spray tips and another width between another pair of adjacent spray tips is not the same.

7. The agricultural applicator of claim 1, wherein the telescoping tube-shaped member is extendable and retractable to adjust a height of the spray tip above the boom.

8. The agricultural applicator of claim 7, wherein the telescoping tube-shaped member has a proximal end nearest the boom, the proximal end adjustable to change a first angle between the telescoping tube-shaped member and the boom.

9. The agricultural applicator of claim 8, wherein the telescoping tube-shaped member has a distal end opposite the proximal end, the distal end rotatably connected to the spray tip.

10. The agricultural applicator of claim 7, wherein a spray angle measured from vertical to a longitudinal axis of the spray tip extending through an outlet of the spray tip is adjustable by rotating the spray tip towards or away from the front of the boom, the front of the boom facing a direction of travel as the boom travels through a crop.

11. The agricultural applicator claim 7, wherein a telescoping tube angle measured from a longitudinal axis defined by the telescoping tube-shaped member to a boom longitudinal axis is adjustable by rotating the telescoping tube-shaped member towards or away from a front of the boom, the front of the boom facing a direction of travel as the boom travels through a crop.

12. The agricultural applicator of claim 1, wherein the base is magnetic and magnetically secure the base to the boom.

13. The agricultural applicator of claim 1, wherein the base is removably clamped or removably secured with fasteners to the boom.

14. The agricultural applicator of claim 1, wherein a width between adjacent bases is adjusted by changing the location of one of the adjacent bases mounted to the boom.

15. The agricultural applicator of claim 1, wherein the telescoping tube-shaped member extends from a locking ball and socket joint proximate the base to an adjustment ball connected to the spray tip, the adjustment ball providing three degrees of freedom of movement at a second end of the telescoping tube-shaped member to adjust the position of the spray tip.

16. A method for spraying a crop in a field with an agricultural applicator comprising a boom having a plurality of boom nozzles extending along the boom, the method comprising the steps of:
   fluidly connecting a plurality of spray nozzles to the plurality of boom nozzles; each spray nozzle comprising:
      a spray tip located gravitationally above the boom;
      a hose fluidly connecting one of the plurality of boom nozzles to the spray tip, wherein liquid is ported from the boom nozzle to the hose;
      a base connected to the boom;
      a telescoping tube-shaped member, each telescoping tube-shaped member extending between the spray tip and the base, each telescoping tube-shaped member having three degrees of freedom of movement at a first end proximate the base;
   attaching a first spray nozzle of the plurality of spray nozzles at first axial end of the boom;
   attaching a second spray nozzle of the plurality of spray nozzles at a second axial end of the boom;
   attaching a remaining plurality of spray nozzles between the first spray nozzle and the second spray nozzle.

17. The method of claim 16, further comprising the step of extending and retracting the telescoping tube-shaped member to increase or decrease the height of the spray tip above the boom.

18. The method of claim 16, further comprising the step of independently adjusting a spray angle of each spray tip, the spray angle measured from a longitudinal axis extending through the spray tip to vertical.

19. The method of claim 16, including the step of moving the boom through a crop to bend a crop canopy of the crop, each spray tip applying a fluid to the bent crop.

* * * * *